THOMAS & MAST.

Wheel Cultivator.

No. 47,055.

Patented Mar. 28, 1865.

Witnesses:
E. R. M. Kean
P. T. Dodge

Inventor:
J. H. Thomas
P. P. Mast
By their Atty's
Smith & Dodge

AM. PHOTO-LITHO. CO. N.Y. (OSBORNE'S PROCESS)

UNITED STATES PATENT OFFICE.

J. H. THOMAS AND P. P. MAST, OF SPRINGFIELD, OHIO.

IMPROVEMENT IN CULTIVATORS.

Specification forming part of Letters Patent No. 47,055, dated March 28, 1865.

*To all whom it may concern:*

Be it known that we, J. H. THOMAS and P. P. MAST, of Springfield, in the county of Clarke and State of Ohio, have invented a new and useful Improvement in Cultivators; and we do hereby declare the following to be a full, clear, and exact description of the same, reference being had to the accompanying drawings, in which—

Figure 1:
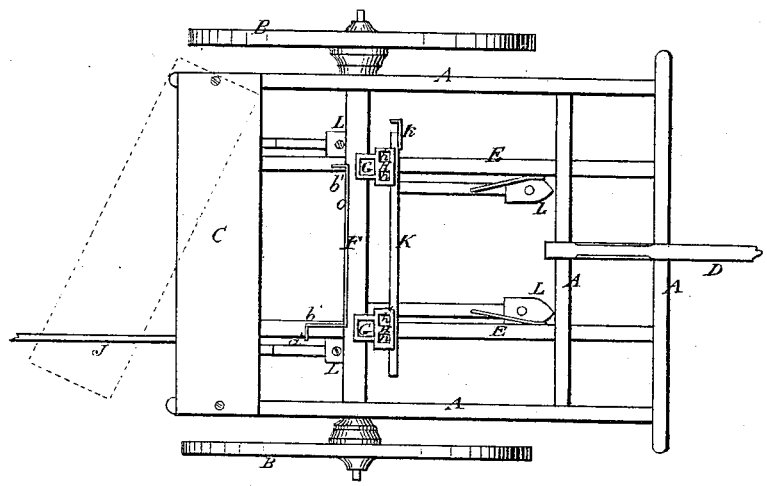
Figure 5:
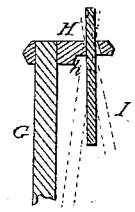
Figure 4:
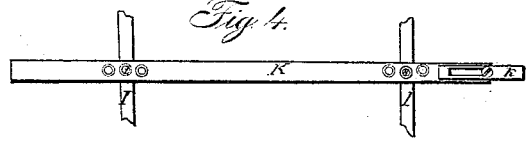
Figure 3:
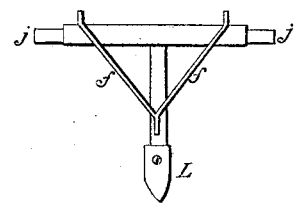
Figure 2:
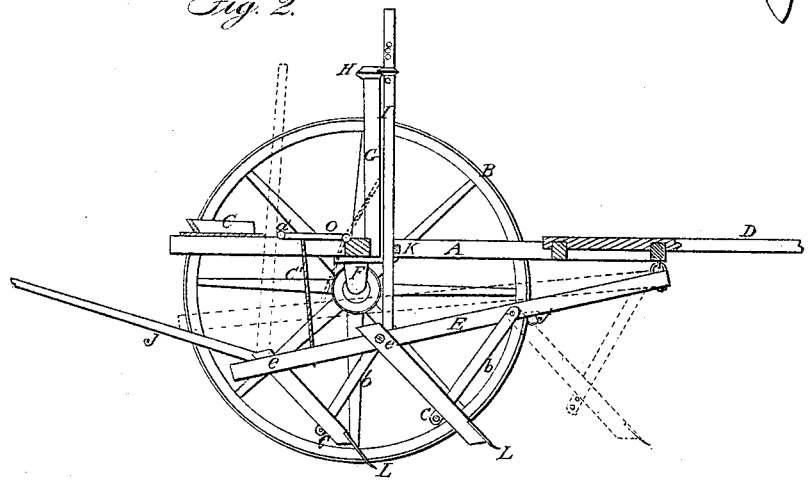

Figure 1 is a plan view of our machine. Fig. 2 is a vertical longitudinal section of the same, and Fig. 3 is a front view of an intermediate tooth. Fig. 4 is a front view of the stretcher with its adjustable stop. Fig. 5 is a sectional view of the plate at the top of the standard.

The nature of our invention consists in such an arrangement and construction of parts as will enable the operator to guide the plows with ease and secure to them a greater degree of lateral motion without rising from the ground than has been secured by the ordinary methods of construction.

That others may understand our invention in its construction and operation, we will more particularly describe it.

The parts marked A constitute the main frame of the machine. B B are the wheels. C is the driver's seat. D is the tongue. E E are the drag-bars. F is the axle.

In constructing our machine the parts already named are constructed in any ordinary manner. We then erect upon the axle F the standards G G, upon the top of each of which is placed a plate, H, having through its projecting portion the holes $h\,h'$. Inserted through the holes $h\,h$ are the suspenders I I, attached at their lower ends to the drag-bars E, the rear ends of which are thereby supported. For convenience a series of holes are bored through the upper ends of the suspenders I, through which pins may be inserted to sustain the drag-bars E at any desired elevation from the ground. The drag-bars at their front ends are secured to the front of the frame A by any suitable joint which will allow free motion to said bars.

The cultivator-teeth L are pivoted to the drag-bars at $e$ on alternate sides of the bar, and are maintained in the proper position by the braces $b$ and pins $c$. To one of the bars we also attach the handle or lever J, projecting beyond the rear of the machine, for the guidance of the cultivators when the operator prefers to walk behind rather than ride upon the machine.

To the suspenders I I is pivoted or secured the adjustable stretcher K, having at one end the adjustable stop $k$, the use of the same being to compel the cultivators to move with uniformity, and to prevent them from striking and interfering with the wheels.

If it be desirable to set the cultivators nearer together, the suspenders are placed in the holes $h'\,h'$.

Fig. 3 represents a supplemental cultivator-tooth, which may be used when convenient or desirable. Upon each drag-bar, near the forward brace, we place suitable bearings, in which the journals $j\,j$, Fig. 3, are placed. The forked brace $f$ is secured, one part to each drag-bar near its forward end, all of which is clearly shown by the red lines in Fig. 2.

A rock-shaft, O, is pivoted to the upper rear corner of the axle, and extending lengthwise thereof a distance equal to the space between the standards G G. At each end this shaft is provided with a projecting arm, $b'$, to which cords or chains $c'$ are attached at one end, the opposite end being fastened to the beams E. The right-hand arm $b'$ is made longer than the other, and is provided with a crank or handle, $a'$, which, when the plows are in operation, is brought within easy reach of the driver on the seat. By taking hold of this handle or crank $a'$ and turning it up and forward the plows are elevated from the ground, and by reversing it they can be let down at pleasure. The rock-shaft, being pivoted at the rear side of the axle, can be rotated until the left-hand arm $b'$ comes in contact with the standard G, the handle $a'$ projecting by the side of the right-hand standard until the point at which the cord $c'$ is united thereto is carried past the center of gravity, which causes the plows to remain suspended without the use of any catch or other device for holding the handle up.

The operation of our machine is as follows: The depth to which the plows are required to cut is regulated by pins through the holes in the suspenders I above the plates H, and the lateral swing of the same is regulated by the cross-piece or stretcher K, which may be adjusted endwise, and lengthened out by the adjustable stop $k$. The swing of the cultivators is arrested by the end of the stretcher K, or the stop $k$ striking against the inner side of one or other of the side frame-pieces. When all is ready, the driver takes his seat, places a foot upon each drag-bar, and as he drives through the field, one wheel upon each side of a row of plants, he with his feet guides the plows near or far from the same, as the case may require. If the shovels, or one of them, comes in contact with a stump or other firm substance which might endanger the breaking of the machine, the wooden or other frail pin $c$, inserted through the hole in the brace $b$, will give way and break more easily than any other part of the machine, and allow that plow to swing back and pass over the obstruction. If it be deemed more convenient, the operator can guide the plows, while walking behind the machine, by means of the lever-handle J.

When not cultivating corn, or when it is desired to scarify all of the surface, the supplemental plow may be attached by means of the bearings, &c., before mentioned.

The seat-board may be swung upon one of its connections, as shown in Fig. 1, in order to turn the lever J up in the position shown in red in Fig. 2—a convenient position when packing away during the season of disuse.

Having described our invention, what we claim as new, and desire to secure by Letters Patent, is—

1. Swinging the suspenders I I from the top of the standards G G, for the purpose set forth.

2. The combination of plates H H, suspenders I I, and standards G G, as described, and for the purpose set forth.

3. So pivoting the rock-shaft O, from which the beams E are suspended, as that when the handle $a'$ is turned up and thrown forward it shall remain in that position, and thus keep the plows suspended without the use of any catch or other device, substantially as set forth.

4. The adjustable stop $k$, in combination with the adjustable stretcher K, and suspenders I I, substantially as described and set forth.

5. The shaft and journals $j\ j$, in combination with the braces $f$ and drag-bars E E, whereby the supplemental tooth may be readily attached, maintained in position, and allowed to swing backward when the wooden pin $c$ is broken, substantially as described and set forth.

J. H. THOMAS.
P. P. MAST.

Witnesses:
B. HOLTZ,
W. C. DODGE,
WILLIAM ENOCH.